United States Patent
Tannenbaum

(10) Patent No.: US 7,978,844 B1
(45) Date of Patent: Jul. 12, 2011

(54) SELECTIVE TELEPHONE RINGING-SIGNAL INTERRUPTION

(75) Inventor: David H. Tannenbaum, Dallas, TX (US)

(73) Assignee: Union Beach L.P., Dallas, TX (US)

( * ) Notice: Subject to any disclaimer, the term of this patent is extended or adjusted under 35 U.S.C. 154(b) by 1192 days.

(21) Appl. No.: 11/305,249

(22) Filed: Dec. 16, 2005

(51) Int. Cl.
*H04M 1/00* (2006.01)

(52) U.S. Cl. .............. 379/376.02; 379/255; 379/373.02; 455/567

(58) Field of Classification Search ............... 379/93.02, 379/106.05, 106.09, 179, 207.08–207.1, 379/207.16, 211.03, 211.04, 252, 256, 375.01, 379/376.02, 418, 215.01, 255, 210.03, 70, 379/77, 88.24, 210.02, 361, 373.01–374.02, 379/386, 413.01, 911, 201.01; 340/995.1; 455/462, 401, 567, 88
See application file for complete search history.

(56) References Cited

U.S. PATENT DOCUMENTS

| | | | |
|---|---|---|---|
| 4,942,598 A | 7/1990 | Davis | |
| 5,206,900 A | 4/1993 | Callele | |
| 5,299,260 A | 3/1994 | Shaio | |
| 5,642,411 A | 6/1997 | Theis | |
| 5,748,709 A | 5/1998 | Sheerin | |
| 5,999,611 A | 12/1999 | Tatchell et al. | |
| 6,026,156 A * | 2/2000 | Epler et al. | 379/215.01 |
| 6,163,606 A | 12/2000 | Otto | |
| 6,327,343 B1 | 12/2001 | Epstein et al. | |
| 6,556,664 B1 | 4/2003 | Langsenkamp | |
| 6,917,680 B1 * | 7/2005 | Korn et al. | 379/373.01 |
| 6,999,731 B2 * | 2/2006 | Cronin | 455/88 |
| 7,212,620 B1 * | 5/2007 | Mastro | 379/210.03 |
| 7,353,047 B2 * | 4/2008 | Boyd | 455/567 |
| 7,529,564 B2 * | 5/2009 | Silver | 455/567 |

* cited by examiner

*Primary Examiner* — Md S Elahee
(74) *Attorney, Agent, or Firm* — Fulbright & Jaworski L.L.P.

(57) ABSTRACT

Systems and methods are disclosed which allow a person to pre-set preferred calling times for receiving incoming calls. During these pre-set times (which could vary from day to day) calls that arrive are interrupted such that ringing tone is not applied to at least some of the telephones at the user's premises. The caller is informed that the user prefers not to receive calls until the pre-set time. In one embodiment, the caller is given the option of leaving a message or, if the caller desires, completing the call. The system can be implemented by a call answer machine at the customer's premises while in another embodiment the interrupt occurs at a central switching point.

20 Claims, 3 Drawing Sheets

US 7,978,844 B1

SELECTIVE TELEPHONE RINGING-SIGNAL INTERRUPTION

TECHNICAL FIELD

This invention relates to telephone systems and more particularly to systems and methods for selective telephone ringing-signal interruption.

BACKGROUND OF THE INVENTION

It is 9:01 AM Sunday morning. You are sound asleep. It has been a hard week and this is your one day to catch up on some needed sleep. The phone rings. And rings! Slowly you sit up. The phone rings again. Impatient. You pick up the receiver, forcing civility into your voice. The caller, a neighbor, wants to know if he could borrow a ladder. "Why are you calling so early", you either ask, or at least think. The answer is simple. The caller did not realize that you preferred to sleep Sunday mornings.

This scenario is played over and over, only the time and days of the week change. It is particularly troublesome for those who work non-standard shifts and are thus sleeping when most other people are awake. The temptation is to block calls (which is not an easy task) for certain hours, but then emergency or other important calls cannot get through. Often people have separate numbers for such emergencies, special codes programmed into their telephone systems so only a few people can get through, or they rely on caller ID to allow certain callers through while blocking other callers. None of these systems solve the problem particularly well.

It is now 9:30 PM Tuesday evening. You have a plane to catch at 6:00 AM and your alarm is set for 3:00 AM. You will be making a major presentation later in the day at your destination. The phone rings, waking you from a deep sleep. It is your neighbor again, wanting to know why you were so grumpy on Sunday. There must be a better solution to this problem than taking the phone off the hook—or finding a new home away from friendly neighbors.

BRIEF SUMMARY OF THE INVENTION

Systems and methods are disclosed which allow a person to pre-set preferred calling times for receiving incoming calls. During these pre-set times (which could vary from day to day) calls that arrive are interrupted such that ringing tone is not applied to at least some of the telephones at the user's premises. The caller is informed that the user prefers not to receive calls until the pre-set time. In one embodiment, the caller is given the option of leaving a message or, if the caller desires, completing the call. The system can be implemented by a call answer machine at the customer's premises while in another embodiment the interrupt occurs at a central switching point.

DETAILED DESCRIPTION OF THE INVENTION

Figure 1:
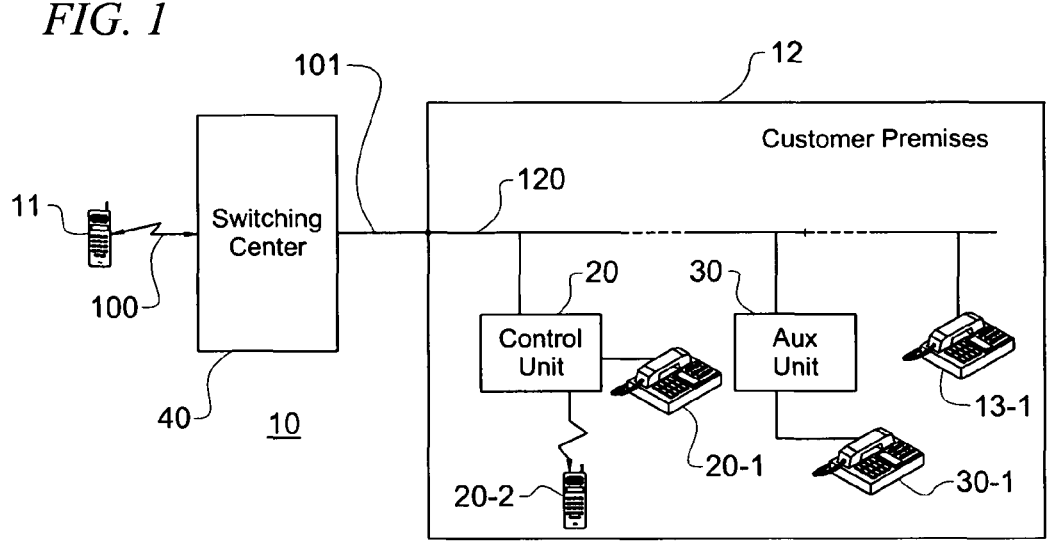
FIG. 1 shows one embodiment of a system employing the inventive concept.

FIG. 1 shows one embodiment of system 10 employing the inventive concept in which calling party 11 places a call to a telephone number associated with customer premises 12. In the embodiment shown, the telephone line at premises 12 is line 120 to which a plurality of telephones 20-1, 20-2, 30-1, and 13-1 are connected. While in the embodiment the called telephone is located at a premises, the called telephone can be any telephone, including a wireless telephone.

In operation, the call would be placed from device 11 (wireless or wireline) via communication path 100 and would pass through one or more switching centers 40 and would be routed to the called telephone via a connection, such as connection 101. Connection 101 can be wireline or wireless, as desired. In the typical situation, the switching center(s) will identify the location of the called telephone and then will send some form of ringing signals to the telephone to alert the user at the called telephone that an incoming call is available for answering. The exact operation at this point depends upon whether the call is wireline or wireless, but in any situation, ringing signals eventually are directed to the dialed telephone. These signals can be the actual ringing voltage (the traditional ringing that we are all familiar with), or they can be one or more codes instructing the telephone to commence ringing (alerting the called party that a call is available to be answered), or the ringing signals can be a musical tune (or other distinctive sound) sent from the switching center, or activated by a control signal.

In one embodiment, control unit 20 at customer premises 12 (or within the called phone) detects the applied ringing signal and, assuming this is a non-preferred calling time, intercepts or blocks the ringing signals, thereby preventing the ringing signals from causing the called telephone ringer (or speaker) from sounding an audible alarm to the called party. One embodiment of control unit 20 will be discussed in more detail with respect to FIG. 2. Control unit 20, upon intercepting the incoming call, then provides the caller with the opportunity to leave a message for the called party, or if the calling party desires, allows the calling party to be connected through to the called party thereby effectively overriding the intercept.

As shown in FIG. 1, line 120 at customer premises 12 is a traditional telephone line having many connections throughout the user's premises. Thus, control unit 20 can be attached at one point while auxiliary unit 30 can be connected at another point, and telephone 13-1 can be connected at another point. Control unit 20 can, for example, be connected to telephone 20-1 by wireline and connected to telephone 20-2 wirelessly. Note, control unit 20 (or at least some portions thereof) can be within a telephone, if desired. Note also, not all telephones at premises 12 need have their ringing signals intercepted. For example, telephone 13-1 is connected directly to telephone line 120 and thus, in the embodiment shown, will ring when ringing signals are applied to the line. Telephones 20-1 and 20-2 will ring only when allowed to (or not inhibited from ringing) by control unit 20. The ringing to telephone 30-1 is controlled by auxiliary unit 30 which, in the embodiment shown, operates (as will be discussed) from signals sent from control unit 20.

Figure 2:
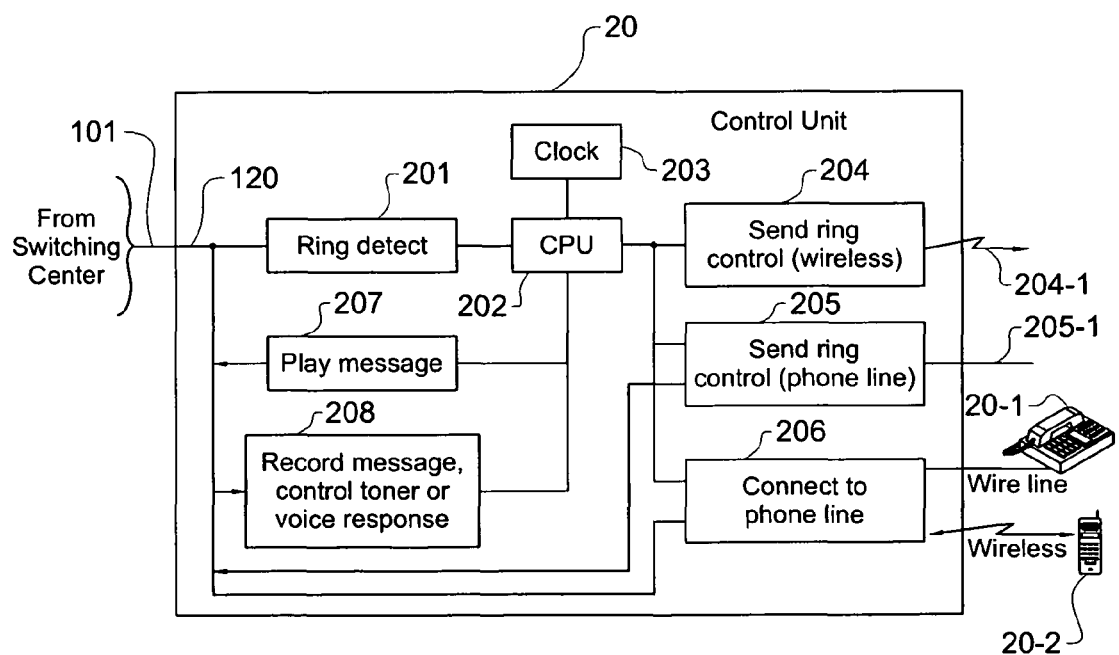
FIG. 2 shows one embodiment of a control unit for controlling ringing intercept.

FIG. 2 shows one embodiment of control unit 20 for controlling ringing intercept with respect to particular telephones. As shown, ring detect 201 monitors telephone line 120 for ringing signals. When such ringing signals are present CPU 202 is notified. CPU then determines whether the current time, for example, as obtained from clock 203, is within or outside of a preferred time. The preferred time having been previously established by one or more users of the telephones connected to line 120. Since in the premises situation it is the telephone line that is called, any number of telephones can be installed, (as shown in FIG. 1), the discussion herein will focus on the calling line as being the same as the called telephone number. Of course, in the situation of wireless or other systems where the called number only reaches one terminating device, the operation will vary, but will be essentially the same as that discussed with respect to telephone 20-1 (or 20-2) where control unit 20 intercepts the ringing signals. In such a situation, the control unit will be within the called device.

Once CPU 202 determines that a call is arriving at a time when the user does not wish to receive calls (this can be thought of as the non-preferred time), the CPU operates to enable play message control 207 to send a message to the calling party telling the calling party of this fact and requesting the calling party to either leave a message (if that option is available), or to override the intercept and allow the call to be placed to the called telephone. For example, the calling party can be instructed to dial (or speak) one to ring the called party. Upon receipt of an override command from the calling party, CPU 202 then instructs ring control 204 (wirelessly), or ring control 205 (over the wireline) to send a command to auxiliary unit 30 to allow (or apply) ringing tone to the called telephone. At the same time, for telephones connected directly to control unit 20, a similar signal is sent to telephone 20-1 or 20-2 via unit 206. When the user at any of these telephones answers the incoming call, the called telephone is then connected to calling line 120 for communication with the calling party.

If the calling telephone user opts to leave a message, then message recorder 208 is connected to the calling line.

Figure 3:
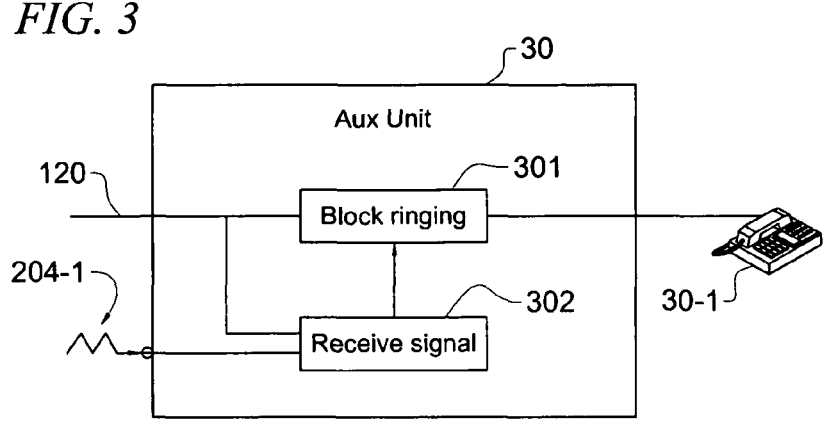
FIG. 3 shows one embodiment of a unit for blocking ringing signals at a telephone connection point.

FIG. 3 shows one embodiment of auxiliary unit 30 for blocking ringing signals at a telephone connection point. Unit 30 would be used, for example, in situations where it is not practical to connect all telephones through a common point, such as, through control unit 20. Ringing signal blocker circuit 301 is set up to not allow ringing signals to pass unless a signal is received from circuit 302. Alternatively, the system can work just the reverse, such that only when a signal has been received will the unit block ringing signals. In such a situation, then it would be possible for control unit 20 to send out a signal during the non-preferred times that would cause the ringing signals to be blocked. An all-clear signal would then be sent during the "do not care" or preferred period. Note that in the context of this discussion, it is not important whether it is thought of as intercepting ringing during non-preferred times or allowing ringing during preferred times. The result is the same.

Figure 4:
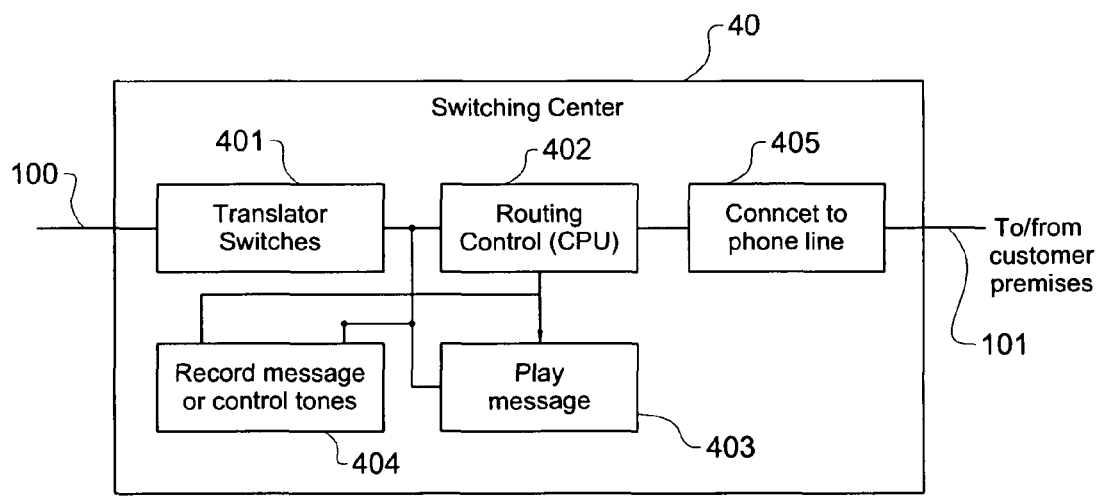
FIG. 4 shows one embodiment of a central network controlled system and method.

FIG. 4 shows one embodiment of a central network controlled system which can be located away from the customer's premise. Switching center 40 contains translator switches 401 which may be spread out over several centers but which function to route a calling connection incoming from a calling line to a particular called line, such as connection 101 which is identified with the called number. As discussed above, this line can be wireline or wireless. Routing control CPU 402 serves roughly the same function as does control unit 20 (FIG. 2) in that when a call is directed to connection 101 during a non-preferred time the CPU acts to block the call (or at least the ringing signals) from going to connection 101 and instead plays a message to the calling line via play message unit 403 and records a message from the calling line via record message unit 404. If the calling party overrides the intercept, for example by pressing the "1" key (or by voice response by saying, for example, "override"), then CPU 402 enables (or disables) switch 405 thereby allowing ringing signals to be applied to the called telephone. Note that if the original ringing signals have ceased, then unit 405 (or unit 20 for the premises controlled embodiment) can reapply the ringing signals.

Figure 5B:
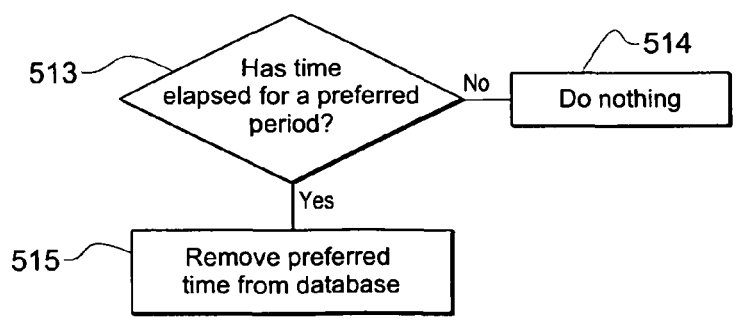
FIGS. 5A and 5B show an embodiment of a method of operation of the concepts of the invention.
Figure 5A:
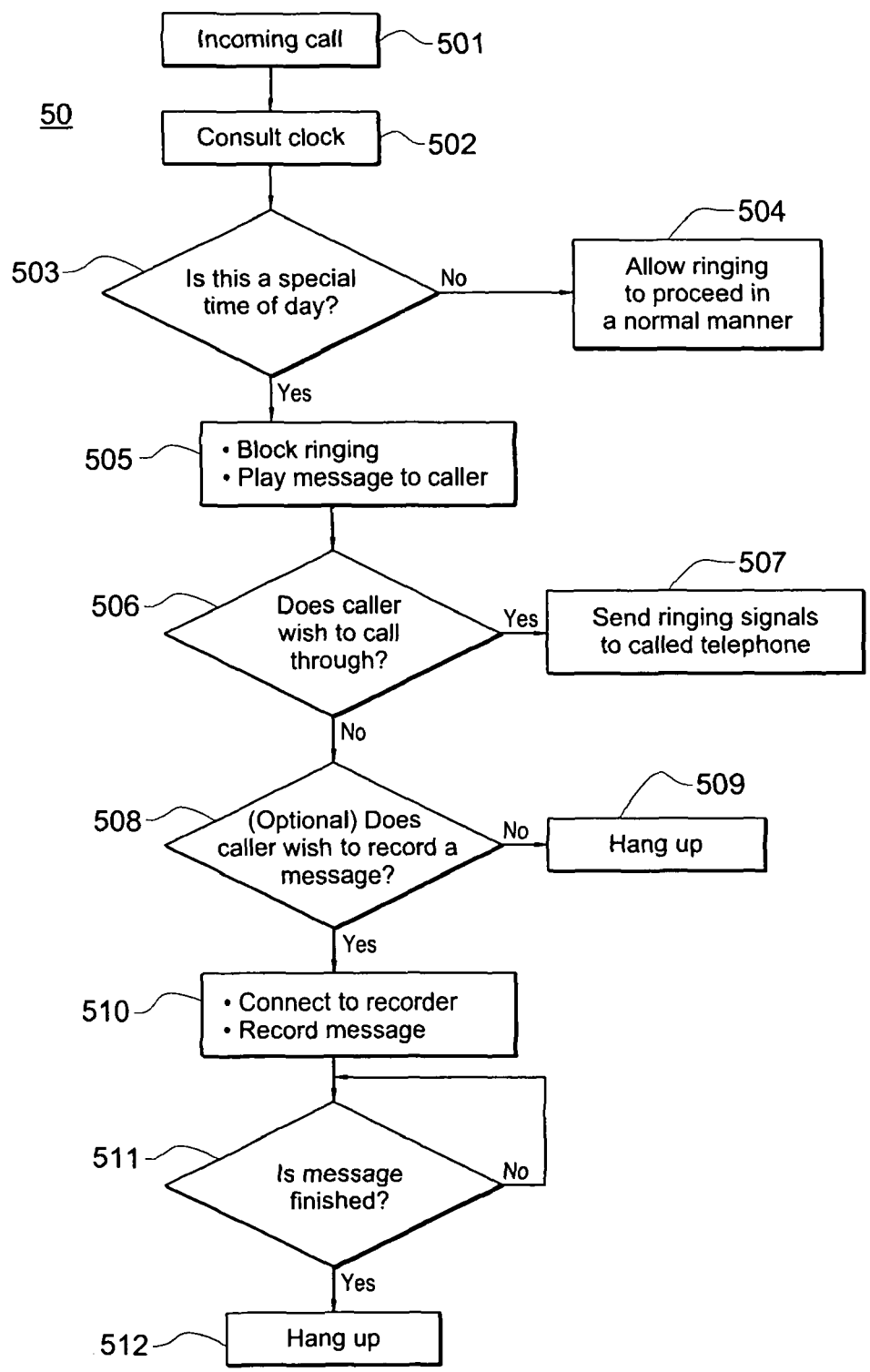

FIG. 5A shows one embodiment 50 of method of operation of the concepts of the invention, such that, when an incoming call is detected via process 501, the CPU, or other control device, consults a time of day clock (process 502) and compares the incoming call time (process 503) with non-preferred times as previously received from the user of the called telephone line and stored in memory (not shown).

If this is not a special (i.e non-preferred) time, then ringing is allowed to proceed in the normal manner, as shown by process 504. However, if this is a non-preferred time, then process 505 blocks the application of ringing signals to the telephone line and plays a message to the caller informing the caller that this is a non-preferred time. The exact wording of the message is optional. For example, the message can give the preferred times, or it might just say that this time is a non-preferred time. In any event, the caller can be instructed to either remain on the line and the call will go through (not a preferred method), or the caller can be asked to press a number, such as "1", on the keypad if the caller wishes the call to go through regardless of the called party's desires. Also, the caller can answer by voice response by saying, for example, "override". Or the caller can say "put me thorough anyway". In such a situation, when an override is requested (process 506), enables process 507, and the call is put through to the called party by sending ringing signals to the called line.

In situations where the calling party does not wish to override the called party's desires, then the calling party can be given the opportunity to leave a message (process 508). After the message is complete, processes 510 and 511, the call is terminated, process 512. Also, if desired, automatic number identification (ANI) can be used to record the calling number so that the calling party can know who called during the non-preferred hours. The called party can retrieve the messages in the well-known manner.

Note that the non-preferred hours can be various times of the day or night, and can vary from day to day. If desired, the times can be only temporary, and thus, as shown in FIG. 5B, will be eliminated after a certain number of days or at a certain time as controlled by processes 510, 511, and 512.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A telephone ring prevention system comprising:
a control unit operative when an incoming call which is directed to a specific called telephone line of a user is detected during a non-preferred calling time of said user unique to said telephone line for preventing the ringing signals associated with said incoming call from activating telephone ringers of at least some of the telephones associated with said called telephone line; and
said control unit further operable when said ringing signals are prevented said telephones associated with said called for telephone line for allowing a party calling said telephone line to override said preventing of said ringing signals in response to an override signal request from said calling party such that said ringing signals activate the telephone ringers said telephones associated with of said called telephone line.

2. The system of claim 1 further comprising:
a recorder for accepting from said calling party a message in lieu of overriding said preventing of said ringing signals.

3. The system of claim 2 wherein said control unit is located at a network point.

4. The system of claim 2 wherein said control unit is located within a premises local to said called line.

5. The system of claim 1 wherein said control unit is within at least one telephone associated with said called telephone line.

6. A telephone ringing-signal interrupt system comprising:
means for pre-setting a non-preferred calling period by a user of a called line;
means for inhibiting ringing to at least some of telephones associated with said called line during said non-preferred calling period; and
means operable selectively by a caller on a call by call basis for allowing said caller to override said inhibiting of said ringing in response to an override signal request from said caller such that said ringing activates telephone ringers of said telephones associated with said called line.

7. The system of claim 6 wherein said inhibiting means is located at a network point.

8. The system of claim 6 wherein said inhibiting means is located within a premises local to said calling line.

9. The system of claim 6 wherein said inhibiting means is located within a telephone associated with said calling line.

10. A control unit for attachment to a user premises telephone line, said control unit comprising:
a ringing signal detector for determining when a call from a calling party is incoming to said telephone line;
a processor operative when an incoming call is detected during a preferred calling time of said user for allowing said ringing signal to activate ringing tones on any telephones connected to said telephone line;
said processor further operative when an incoming call is detected outside of said preferred calling time for preventing said ringing signals from activating said ringing tones on at least some of said telephones connected to said telephone line; and
said processor further operable when an incoming call is detected outside of said preferred calling time for communicating such a fact to said calling party and allowing said calling party to override said preventing of said ringing signal in response to an override signal request from said calling party such that said ringing signals activate said ringing tones on said telephones connected to said telephone line.

11. The control unit of claim 10 further comprising:
a recorder for accepting messages from said calling party when said calling party does not override said preventing of said ringing tones.

12. The control unit of claim 10 wherein said preventing comprises:
a device connected between said telephone line and said some of said telephones for preventing ringing signals from passing through said device; said device comprising:
a detector for receiving a signal from said control unit for allowing ringing signals to pass through said device.

13. A method of controlling ringing at a telephone line, said method comprising:
setting, by a user at said telephone line, time that said user desires not to be disturbed by incoming calls to at least some of telephones of said telephone line;
determining that a call is incoming to said telephone line during said desired not to be disturbed time;
preventing ringing at said telephones of said telephone line for determined call;
informing the calling party as to the not to be disturbed desires of said user; and
allowing said calling party to optionally override said ringing prevention by sending an override signal to a control unit to allow ringing tones to said telephones so as to complete said call to said telephones even during said desired do not disturb time.

14. The method of claim 13 further comprising:
allowing said calling party to leave a message for said telephone user when said calling party desires not to disturb said telephone user.

15. The method of claim 13 wherein said desired do not disturb times can be different for different days of the week.

16. The method of claim 13 wherein said preventing is accomplished at a network center.

17. A method of intercepting certain calls to a telephone line, said method comprising:
preventing ringing signals from being applied to at least some of telephones of said telephone line during a do not disturb time period, said do not disturb time period established by a user of said telephone line, and
after a calling party is informed as to the not to be disturbed desires of said user, allowing said calling party to optionally override said ringing prevention by sending an override signal to a control unit to allow ringing tones to said telephones so as to complete said call to said telephones even during said desired do not disturb time period.

18. The method of claim 17 further comprising:
communicating to said calling party the times that said user desires not to be disturbed.

19. The method of claim 17 further comprising:
allowing said calling party to leave a message for said telephone user when said calling party desires not to disturb said telephone user.

20. The method of claim 17 further comprising:
capturing said calling party's telephone call-back number so as to allow said telephone user to return a non-completed phone call.

* * * * *

UNITED STATES PATENT AND TRADEMARK OFFICE
CERTIFICATE OF CORRECTION

| | | |
|---|---|---|
| PATENT NO. | : 7,978,844 B1 | Page 1 of 1 |
| APPLICATION NO. | : 11/305249 | |
| DATED | : July 12, 2011 | |
| INVENTOR(S) | : Tannenbaum | |

It is certified that error appears in the above-identified patent and that said Letters Patent is hereby corrected as shown below:

Column 5, Claim 1, Lines 11, delete the portion of text reading "prevented said telephones" and replace with --prevented for said telephones--.

Column 5, Claim 1, Line 12, delete the portion of text reading "for telephone line" and replace with --telephone line--.

Column 5, Claim 1, Line 16, delete the portion of text reading "said telephones associated with of" and replace with --of said telephones associated with--.

Signed and Sealed this
Twentieth Day of September, 2011

David J. Kappos
*Director of the United States Patent and Trademark Office*